Oct. 20, 1964     D. FERRARA     3,153,433

METHOD OF MAKING BOWLS AND THE LIKE

Filed Aug. 16, 1961     2 Sheets-Sheet 1

INVENTOR.
DOMINICK FERRARA
BY J. Christoffersen
AGENT

INVENTOR.
Dominick Ferrara
BY J. Christoffersen
AGENT

United States Patent Office
3,153,433
Patented Oct. 20, 1964

3,153,433
METHOD OF MAKING BOWLS AND THE LIKE
Dominick Ferrara, 22860 Hartman Drive,
Mount Clemens, Mich.
Filed Aug. 16, 1961, Ser. No. 131,925
7 Claims. (Cl. 144—326)

This invention relates to new and improved methods of making hollow objects such as bowls, containers, et cetera, especially, although not exclusively, of materials which cannot be molded readily.

It is known in the art to manufacture wooden bowls and similar objects by means of a wood turning process. According to one such process a primary block, or stock, or wood is rotated in a lathe against a cutting tool. The cutting tool is guided so as to turn the outer surface of the block to a desired shape. The inside of the block is hollowed out by guiding a cutting tool back and forth across one end of the block, while the other end is secured to a rotating faceplate mounted on the headstock spindle of the lathe.

The material hollowed out of the primary block is a waste product of the manufacturing process. Depending upon the size of the object and the type of wood employed, this waste may add considerably to the cost of the finished product. Moreover, because of certain limitations of a lathe, the process described above generally is limited to the manufacture of bowls and the like which are annular in cross section.

It is an object of this invention to provide new and improved methods of making hollow objects such as bowls, containers, and the like.

It is another object of this invention to provide new and improved methods of making bowls and the like from materials which cannot be molded readily.

It is still another object of this invention to provide an improved method of cutting a primary block in the manufacture of bowls, or portions thereof.

It is a still further object of this invention to provide new and improved methods of making bowls and the like, which methods result in a reduction in waste material.

It is still another object of this invention to provide new and improved methods of manufacturing bowls and the like of any desired shape and size.

These and other objects are accomplished according to one method of the invention by first sawing, or otherwise cutting, a primary block to form a body which has the approximate outer shape of either the desired object or a section thereof. A short lengthwise cut next is made inward of the body from the outer surface and continued along a closed path which is selected in accordance with the desired wall thickness and shape of the object. The detached, inside portion of the body then is lifted out, leaving an open-ended shell having the approximate inner and outer dimensions of the desired object, or portion thereof. The order in which the first and second steps described above are carried out may be reversed if it is so desired.

The second and third steps described above may be repeated a number of times, first on the inner body which is removed from the first shell, and then on the inner bodies which are removed from successively generated shells. A number of shells similar in shape and graduated in size are provided thereby. The portions of each shell adjacent the lengthwise cut aforementioned are joined by a suitable binder, which preferably blends with the material content of the shells. Each shell may have a bottom affixed at one end to form a number of bowls, or other objects, which are graduated in size. These bowls then may be trimmed and sanded to desired shape and smoothness.

As will be described more fully hereinafter, the separate shells generated from a single primary block may be superposed in certain instances to form a single, large bowl. To form a bowl or other object having a complex geometrical shape, shells cut from two or more primary blocks may be superposed.

In the accompanying drawing, like reference characters refer to like components, and:

FIGURE 1 is a view in perspective of a bowl having an aprproximately "elliptical" cross section;

FIGURES 2(a)–2(e) are views, in perspective, illustrative of certain steps according to one method of the invention for manufacturing the bowl of FIGURE 1;

FIGURE 8 is a diagram showing the relationships of certain of the dimensions of a bowl generated from a single block.

Figure 1:
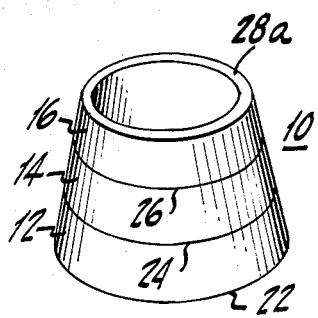
Figure 2:
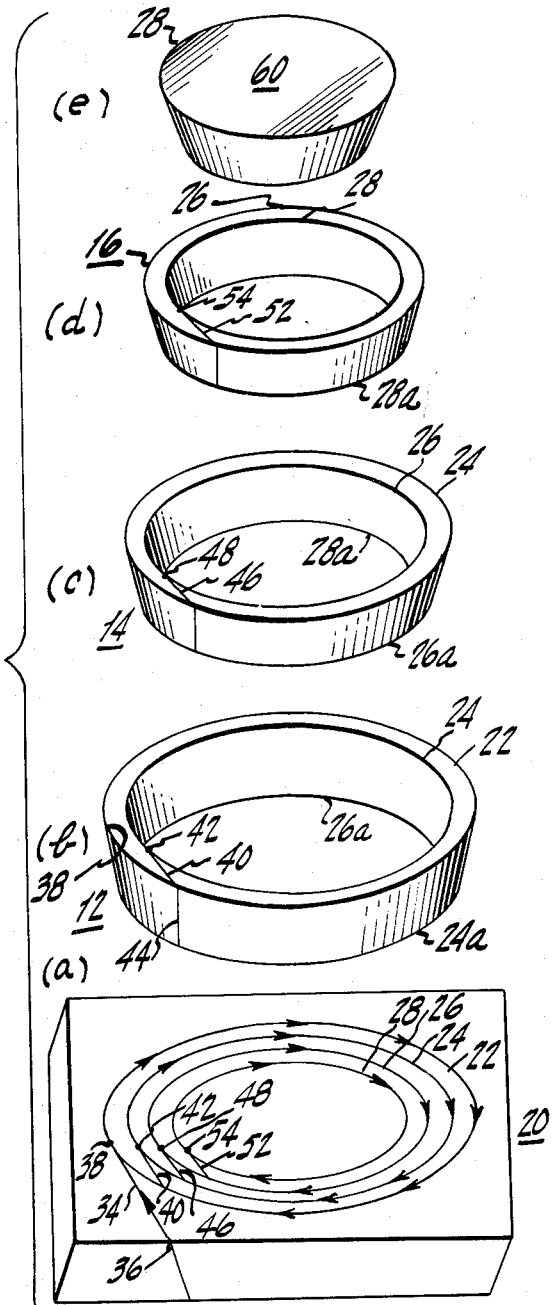

FIGURES 1 and 2 of the accompanying drawing illustrate, respectively, a view in perspective of one form of bowl 10 and various steps according to one method of the invention for making the bowl 10. The bowl 10 comprises several superposed sections 12, 14, 16 of the same height and each having the same shape as the bowl 10, there being in this instance a large section 12 and successively smaller sections 14, 16 respectively. The bowl 10 is illustrated as having a somewhat elliptical horizontal cross section in order to demonstrate the fact that the invention is not limited to the manufacture of bowls of annular cross section. Of course, the sections 12, 14, 16 also could be annular in cross section, in which case the bowl 10 would have a circular frustroconical shape.

According to one method of the invention, the various sections 12, 14, 16 of the bowl 10 are generated from a single primary block, such as the block 20 of FIGURE 2(a). The term "primary block" or simply "block" is used here and in the appended claims to define a piece of wood or other material from which either the entire object, bowl, etc. or section thereof is derived. The primary block 20, which may be wood, has a height equal to the vertical height of each of the separate sections 12, 14, 16. A pattern of "ellipses" 22, 24, 26, 28 is laid out on the top surface of the block 20. These ellipses 22, 24, 26, 28 correspond, respectively, to the largest outer peripheries, or circumferences, of the sections 12, 14, 16 and the largest inner periphery, or circumference, of the smallest section 16, where said peripheries lie in horizontal planes normal to the vertical axis of the bowl 10. The largest outer circumference 24 of the middle section 14 is the same as the smallest outer circumference of the bottom section 12, and the largest outer circumference 26 of the top section 16 is the same as the smallest outer circumference of the middle section 14, as may be seen in FIGURE 1.

The bottom section 12, illustrated in detail in FIGURE 2(b), is generated by sawing, or otherwise cutting, the block 20 along the slanted line 34 from the point 36 at the edge of the block 20 to the point 38 on the "ellipse" 22. This cut is continued along the closed path 22, in the direction of the arrows, to the point 38. During the cutting operation, the cutting instrument, which may be a bandsaw, is held at such an angle relative to the block 20 as to trace out an elliptical path 24a (FIGURE 2b) on the bottom of the block 20. The path 24a on the bottom of the block 20 is the image of, or substantially the image of, the elliptical path 24 on the top of the block 20. The solid inner body defined by the ellipses 22, 24a then is lifted out of the block 20. A short, lengthwise cut 40 is made inward of this body from the outer surface thereof to the point 42. The cut 40 is continued from the point 42 along the closed path 24, in the direction of the arrows, closing on itself at the point 42. The cutting instrument is held at such an angle as to trace out an elliptical path 26a (FIGURE 2b) on the underside of the body while the path 24 is being traced out on the top of the body. This path 26a is substantially the image of the path 26 on the top of the body. The shell 12 generated by the cutting process described above then is separated from the remainder of the body.

The middle section 14, shown in detail in FIGURE 2c, is generated next by cutting the remaining body along the line 46 to the point 48 (FIGURES 2a and 2c). The cut is continued along the closed path 26, in the direction of the arrows, closing on itself at the point 48. The cutting instrument is held at such an angle as to trace out a path 28a (FIGURE 2c) on the underside of the body. The path 28a is substantially the image of the path 28 on the top surface of the body. The shell 14 thus generated then is removed from the body.

The top section 16, illustrated in FIGURE 2d, is generated in a similar manner as follows. A short cut 52 is made in the remaining body from the outer surface to the point 54. The cut then is continued along the closed path 28, in the direction of the arrows, to the point 54. The solid body 60 illustrated in FIGURE 2e remains after the final cutting operation. This body 60 may be used, for example, as a primary block for manufacturing a bowl of smaller size. It is to be noted that a minimum of waste material results in carrying out the process described above.

Each shell 12, 14, 16 is rendered whole by joining the portions adjacent to the cut between the inner and outer surfaces. A binder, such as glue, may be employed for this purpose. A filler also may be added if it is so desired or required. It is desirable that the binder and filler blend with the wood, especially if the bowl is to be left in its natural state, varnished or shellacked. The shells 12, 14, 16 then are inverted and superposed, as illustrated in FIGURE 1, after a binder is first interposed between the mating surfaces of adjacent shells. A bottom (not shown) is affixed at the free end of the shell 12, and the entire combination preferably is clamped until the binder is thoroughly dry. The bowl 10 may be sanded and trimmed to desired dimensions, shape and smoothness and then lacquered or painted, etc., as desired. Of course, the bowl 10 could be inverted and the bottom added at the free end of the smallest section 16.

To manufacture the bowl 10 in accordance with the method described above, it is necessary that the smallest outer circumference of any of the shells 12, 14, 16 be substantially the same as the largest outer circumference of the next smaller shell in order that the shells might be superposed. This requires that the smallest outer circumference of any shell be substantially the same as the largest inner circumference of the same shell. Assuming shells of uniform thickness, this requirement would at first appear to place a limitation on the relationship between the slant height and the depth of a bowl manufactured according to this method. However, such a limitation does not exist inasmuch as the height of the primary block may be selected in accordance with the desired slant height-to-depth relationship. For example, to manufacture a bowl having the same depth as that of the bowl 10, but a different slant height, a different number of shells may be superposed. The primary block in the latter case has a different height than that of the primary block 20 of FIGURE 2a. In other cases, odd numbered shells, according to size, could be superposed to form a first bowl and even numbered shells could be superposed to form a second bowl.

The relationships between the various dimensions of the bowl 10 (FIG. 1) and the eight of the single primary block 20 (FIG. 2a) may be seen more clearly in FIGURE 8, which is an elevation view of a portion of the bowl 10. In FIGURE 8, H is the height of the bowl, L is the slant height, and T is the thickness dimension in a plane normal to the height direction. The actual thickness, as measured normal to the slant height, is T' and the height of the primary block is H'. It is apparent that the angles $a_1$ and $a_2$ are equal, and that cosine $a_1 = H/L =$ cosine $a_2$. Because the smallest outer circumference of each section 12, 14, 16 must be equal approximately to the largest inner circumference of the same section, for reasons discussed previously, points $a$ and $b$ lie on a vertical line, and the distance betwen them is H', the height of the block 20. Given the height H and slant height L of the desired bowl 10, the height H' of the block may be determined as follows:

$$H' = T \cot a_2 \quad (1)$$
$$a_2 = \text{arc cos } H/L \quad (2)$$

thus $$H' = T \cotan (\text{arc cos } H/L) \quad (3)$$

It will also be recognized from FIGURE 8 that:

$$H' = T' \csc a_2 \quad (4)$$

thus $$H' = T' \csc (\text{arc cos } H/L) \quad (5)$$

As will be described more fully hereinafter a bowl, such as the bowl 10, also can be manufactured according to the invention by superposing shells generated from different primary blocks. It will be apparent to those skilled in the art that a bowl of simple geometry, such as the bowl 10, also can be manufactured from a single shell cut from a primary block having a height equal to the depth of the bowl 10.

The cut marks, such as the line 44 in FIGURE 2b, are accentuated in the drawing for purposes of illustration. In actual practice, these marks have been found not to be objectionable in the finished product, nor to detract from the appearance thereof. This is especially so when the primary block 20 is one comprising thin veneer sheets or layers of different woods or different colored woods glued together, for example plywood, or one comprising many small pieces of wood of different kind and/or color glued together.

Figure 3:
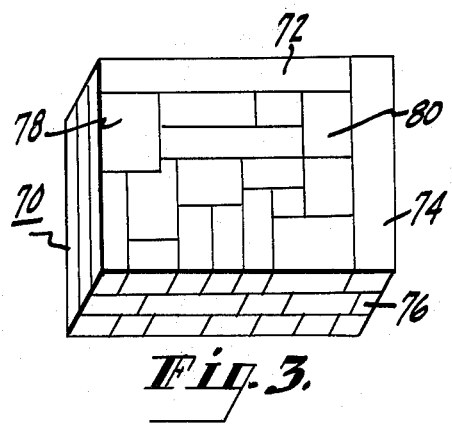
FIGURE 3 is a view in perspective of one form of primary block and is illustrative of the method of making same.
Figure 6:
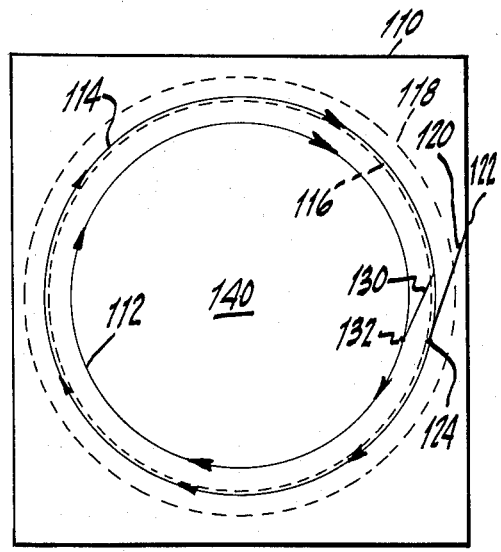

FIGURE 3 is a view in perspective of a primary block 70 prepared by gluing together many small pieces of wood, for example the pieces 72 . . . 80. The various pieces may differ in color, kind, or grain, or they may all be of the same type. The pieces are shown by way of illustration as being stacked in three layers of uniform thickness. It will be understood, however, that any number of layers may be used, depending upon the particular application, and that a layer need not be of uniform thickness throughout. Also, the layers need not be of equal thickness.

Figure 4:
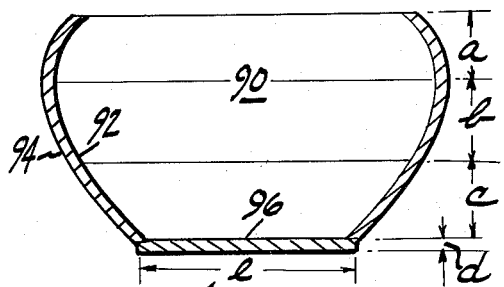
FIGURE 4 is a view in vertical central section of a bowl having a relatively complex geometry.
Figure 5:
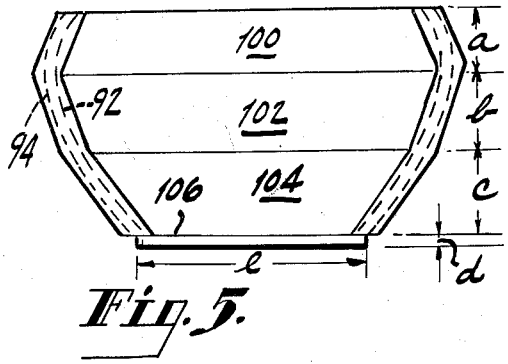
FIGURE 5 is a view in vertical central section of a number of shells superposed to make the FIGURE 4 bowl.

FIGURE 4 is a view in vertical central section of a wooden bowl 90 which has a more complex geometry than the bowl 10 of FIGURE 1. The bowl 90 has an inner wall 92, an outer wall 94 and a bottom 96, and has an annular, or ring-shaped cross section in any horizontal plane. Such a bowl 90 may be manufactured by superposing shells generated in accordance with the present invention. More particularly, the bowl 90 may be manufactured by superposing three shells 100, 102, and 104 in the manner illustrated in FIGURE 5. In FIGURE 5, the shells 100, 102, and 104 are illustrated in vertical central section; the walls 92, 94, of the bowl 90 are indicated by dashed lines. The usual cross-sectional shading is omitted in FIGURE 5 to avoid unduly complicating the drawing.

The unfinished shells 100, 102, 104 are necessarily thicker than the wall thickness of the bowl 90 for obvious reasons. These shells 100, 102, and 104 have heights $a$, $b$, and $c$, respectively, and preferably are generated from separate primary blocks because of the complex geometry of the bowl 90. The bottom has the form of a circular disk 106 having a diameter $e$ and a thickness $d$. This piece 106 is affixed to the bottom of the lowest section 104.

The top shell 100 is generated from a primary block 110 which has a height or thickness $a$. This block 110 is illustrated in plan view in FIGURE 6. Two concentric circles 112, 114 are laid out on the top surface of the block 110. The diameters of these circles 112 and 114 are equal, respectively, to the inner and outer diameters at the top of the shell 100. A pattern of concentric circles 116 and 118, shown in dotted lines, and having diameters equal, respectively, to the inner and outer diameters at the bottom of the shell 100, may be laid out on the underside of the block 110.

Figure 6:
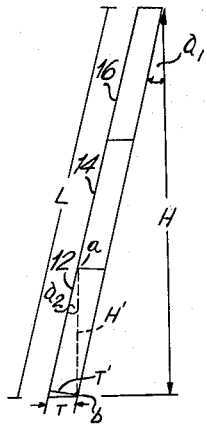
FIGURE 6 is a plan view of a primary block and layout useful in explaining the method of generating one of the shells of FIGURE 5.

The shell 100 is generated by sawing, or otherwise cutting, the block 110 along the line 120 from the point 122 on the edge of the block to the point 124 on the circle 114. This cut is continued along the closed circular path 114, in the direction of the arrows, to the starting point 124. During the cutting process, the cutting instrument is held at such an angle relative to the block 110 as to trace out the circular path 118 on the underside of the block. The conical frustrum thus formed then is removed from the block 110. A cut 130 is made inward of the frustrum to the point 132 and continued along the closed circular path 112, in the direction of the arrows, to the point 132. During the latter cutting operation, the cutting instrument is held at such an angle as to trace out the circular part 116 on the underside of the frustrum. The shell thus generated is the shell 100 of FIGURE 5. The frustrum 140 within the shell of FIGURE 6 is not a waste product, since this frustrum may be used as a primary block for manufacturing another object, such as a bowl of smaller size.

The shells 102 and 104 are generated in a similar manner from two other primary blocks (not shown) having heights $b$ and $c$, respectively. Each of the shells 100, 102, 104 is made whole, by joining the portions adjacent the cut between the inner and outer surfaces, in the manner described previously. The shells 100, 102, 104 are superposed in the positions illustrated in FIGURE 5, and a binder is interposed between the mating surfaces of the shells. The circular disk 106 may be affixed at the bottom of the shell 104 at this time. The inner and outer surfaces of the shells 100, 102, and 104 are trimmed, by sanding or otherwise, to the dotted lines 92 and 94, respectively, which represent the inner and outer walls of the bowl 90. It often is more convenient to delay affixing the bottom 106 until after the inner and outer surfaces of the shells are trimmed to the desired dimensions and smoothness. Of course, the individual shells also could be trimmed separately before being superposed. The exact sequence of steps in the finishing process can be varied to suit a particular application without departing from the spirit of the invention.

As described heretofore, hollow objects of generally unlimited size and shape may be manufactured according to the methods of the present invention. Although the invention has been described in detail thus far with particular reference to the manufacture of wooden bowls, it will be understood that such description is by way of illustration only, and that the invention is limited neither to the manufacture of bowls nor to the use of wood therein. The bowls of FIGURES 1 and 4, for example, could be made of plastic or other suitable material. Moreover, the manufactured object may comprise more than one type of material, or material of the same type but of a varied assortment of colors, or a combination of different materials and different colors, depending upon the particular application. By way of example, consider the object illustrated in FIGURE 7.

Figure 7:
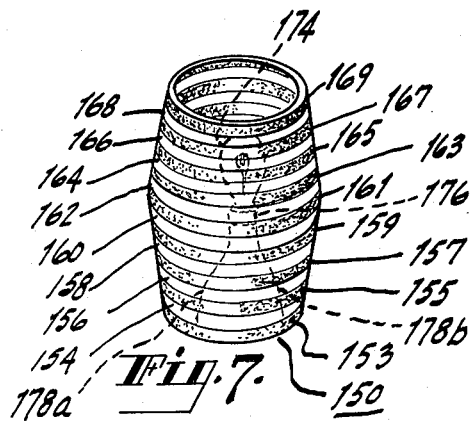
FIGURE 7 is a view in perspective of a lamp manufactured according to the invention.

FIGURE 7 is a view, in perspective, of a lamp 150 manufactured according to the invention. The lamp 150 is illustrated as comprising a number of contiguous, circular rings 153 . . . 169 of varying diameter, but manifestly may be made in other forms. For example, the members 153 . . . 169 could be of the same size, or they could be polygons of the same or different sizes. The even numbered rings 154, 156 etc. may consist of a transparent or translucent material such as clear plastic having good light transmitting properties, relatively speaking. The dark, odd numbered rings 153, 155 etc. may consist of an opaque material such as wood, or a colored plastic or like material which has different light transmitting properties than the even numbered rings 154, 156, etc.

A light bulb 174 and socket 176 therefor are supported within the lamp 150 by a pair of rigid members 178a, 178b. The members 178a, 178b, in turn, are supported by the lamp base (not shown).

The lamp 150 may be manufactured according to the invention by any of the methods described previously. For example, the lower half of the lamp 150 comprising the rings 153 . . . 161 may be cut from a single primary block (not shown) having nine layers of material, the odd numbered layers corresponding to the odd numbered rings 153, 155 etc. and the even numbered layers corresponding to the even numbered layers 154, 156 etc. In this case, the primary block is prepared by first gluing, or otherwise bonding together, nine layers of material of the type described previously. The upper half of the lamp 150 may be produced in a similar manner, and the two halves then superposed and glued as illustrated.

Alternatively, the odd numbered rings 153, 155 etc. may be cut from a first primary block and the even numbered rings 154, 156 etc. may be cut from a second primary block according to the method illustrated in FIGURE 2. The separate rings also could be cut from separate primary blocks, or any combination of the above methods.

What is claimed is:

1. In a method of manufacturing an open-ended hollow member having a height H, a slant height L and a thickness T, measured normal to the height H, from a single primary block having a height $$H^1 = T \cotan(\arccos H/L) = \frac{TH}{\sqrt{L^2 - H^2}}$$

the steps of: laying out a pattern of $N+1$ closed paths, one within the other, on one surface of said block normal to the height thereof, where $N = H/H^1$, adjacent said paths corresponding to outlines of said member in planes which are normal to the height of said member and separated by a distance $H/N$, said paths being graduated in size, the $N+1$th path being the smallest; moving a cutting instrument and said block relative to each other and cutting along the entire first, largest one of said paths on said one surface as said instrument cuts along the image of the second one of said paths on a surface of said block opposite said one surface; cutting inward of said block from said first path to said second path and cutting along the entire said second path on said one surface as said cutting instrument cuts along the image of the third path on said opposite surface, thereby generating a first shell; repeating the step last mentioned a number of times until the cutting instrument has cut along the $N+1$th path and N shells, graduated in size, are generated; and superposing said shells to form the desired hollow member of height H.

2. In a method of manufacturing an open-ended hollow member having a height H, a slant height L and a thickness T, measured normal to the height H, from a single primary block having a height $$H^1 = T \cotan(\arccos H/L) = \frac{TH}{\sqrt{L^2 - H^2}}$$

the steps of: laying out a pattern of $N+1$ closed paths, one within the other, on one surface of said block normal to the height thereof, where $N=H/H^1$, adjacent said paths corresponding to outlines of said member in planes which are normal to the height of said member and separated by a distance $H/N$, said paths being graduated in size, the $N+1$th path being the smallest; moving a cutting instrument and said block relative to each other and cutting along the entire first, largest one of said paths on said one surface as said instrument cuts along the image of the second one of said paths on a surface of said block opposite said one surface; cutting inward of said block from said first path to said second path and cutting along the entire said second path on said one surface as said cutting instrument cuts along the image of the third path on said opposite surface, thereby generating a first shell; repeating the step last mentioned a number of times until the cutting instrument has cut along the $N+1$th path and N shells, graduated in size, are generated; joining the two portions of each shell adjacent the cut between the inner and outer lateral surfaces thereof; and superposing said shells to form the desired hollow member of height H.

3. In a method of manufacturing an open-ended hollow member having a height H, a slant height L and a thickness T, measured normal to the height H, from a single primary block having a height $$H^1 = T \cotan (\arc \cos H/L) = \frac{TH}{\sqrt{L^2-H^2}}$$

the steps of: laying out a pattern of $N+1$ closed paths, one within the other, on one surface of said block normal to the height thereof, where $N=H/H^1$, adjacent said paths corresponding to outlines of said member in planes which are normal to the height of said member and separated by a distance $H/N$, said paths being graduated in size, the $N+1$th path being the smallest; moving a cutting instrument and said block relative to each other and cutting along the entire first, largest one of said paths on said one surface as said instrument cuts along the image of the second one of said paths on a surface of said block opposite said one surface; cutting inward of said block from said first path to said second path and cutting along the entire said second path on said one surface as said cutting instrument cuts along the image of the third path on said opposite surface, thereby generating a first shell; repeating the step last mentioned a number of times until the cutting instrument has cut along the $N+1$th path and N shells, graduated in size, are generated; joining the two portions of each shell adjacent the cut between the inner and outer lateral surfaces thereof; superposing said shells to form the desired hollow member of height H; and joining adjacent said shells to each other.

4. In a method of manufacturing a hollow member from a number of primary blocks, the steps of: (1) cutting a first of said blocks along a first closed path to form a first solid body having dimensions corresponding approximately to the outer dimensions of a first portion of said member; (2) cutting inward of said first body and continuing the cut along a second closed path to form an open-ended shell, severed from said first body and corresponding to said first portion; (3) repeating steps (1) and (2) on at least a second of said primary blocks to form an open-ended shell corresponding approximately in size and shape to a second, different portion of said member; and (4) superposing the shells cut from the different ones of said primary blocks.

5. In a method of manufacturing a hollow member from a number of primary blocks, the steps of: (1) cutting a first of said blocks along a first closed path to form a first solid body having dimensions corresponding approximately to the outer dimensions of a first portion of said member; (2) cutting inward of said first body and continuing the cut along a second closed path to form an open-ended shell, severed from said first body and corresponding to said first portion; (3) repeating steps (1) and (2) on at least a second of said primary blocks to form an open-ended shell corresponding approximately in size and shape to a second, different portion of said member; (4) joining the two portions of each shell which are adjacent the cut between the inner and outer surfaces thereof; and (5) superposing and joining the shells cut from the different said primary blocks.

6. In a method of manufacturing a hollow member from a number of primary blocks, the steps of: (1) cutting a first of said blocks along a first closed path to form a first solid body having dimensions corresponding approximately to the outer dimensions of a first portion of said member; (2) cutting inward of said first body and continuing the cut along a second closed path to form an open-ended shell, severed from said first body and corresponding to said first portion; (3) repeating steps (1) and (2) on at least a second of said primary blocks to form an open-ended shell corresponding approximately in size and shape to a second, different portion of said member; (4) joining the two portions of each shell which are adjacent the cut between the inner and outer surfaces thereof; (5) superposing and joining the shells cut from the different said primary blocks; and (6) affixing a piece of material across one end of the superposed shells to close one end thereof.

7. In a method of manufacturing an open-ended hollow member having a height H and a slant height L and a thickness T, measured in a plane normal to the height H, from a single primary block, the steps of: laying out a pattern of $N+1$ closed paths, one within the other, on one surface of a primary block having a height $H'=T \cotan (\arc \cos H/L)$, said one surface being normal to the height direction of the block, where $N=H/H'$, adjacent said paths corresponding to outlines of said member in planes which are normal to the height of said member and separated by a distance $H/N$, said paths being graduated in size, the $N+1$th path being the smallest; moving a cutting instrument relative to said block and cutting along the entire first, largest one of said paths on said one surface as said instrument cuts along the image of the second one of said paths on a surface of said block opposed to said one surface; cutting inward of said block from said first path to said second path and cutting along the entire said second path on said one surface as said cutting instrument cuts along the image of the third path on said opposed surface, thereby generating a first shell; repeating the step last mentioned a number of times until the cutting instrument has cut along the $N+1$th path and N shells, graduated in size, are generated; and superposing said shells to form the desired hollow member of height H.

References Cited in the file of this patent

UNITED STATES PATENTS

| 210,229 | White | Nov. 26, 1878 |
| 1,552,249 | Tollzien | Sept. 1, 1925 |
| 1,614,967 | Peck | Jan. 18, 1927 |
| 1,767,970 | Erickson | June 24, 1930 |
| 2,827,084 | Massongill | Mar. 18, 1958 |

FOREIGN PATENTS

| 11,977 | Australia | Dec. 11, 1933 |